United States Patent [19]

Lin

[11] Patent Number: 5,337,336
[45] Date of Patent: Aug. 9, 1994

[54] METHOD AND APPARATUS TO DECREASE RADIOACTIVE IODINE RELEASE

[75] Inventor: Chien-Chang Lin, Fremont, Calif.

[73] Assignee: General Electric Company, San Jose, Calif.

[21] Appl. No.: 8,442

[22] Filed: Jan. 25, 1993

[51] Int. Cl.$^5$ ............................................. G21C 19/00
[52] U.S. Cl. .................................... 376/309; 376/306
[58] Field of Search ............... 376/308, 309, 310, 306, 376/282

[56] References Cited

U.S. PATENT DOCUMENTS

| | | | |
|---|---|---|---|
| 3,338,665 | 8/1967 | Silverman | 376/308 |
| 3,920,577 | 11/1975 | Godbee et al. | 252/632 |
| 4,643,871 | 2/1987 | Fajeau | 376/282 |
| 5,130,078 | 7/1992 | Dillman | 376/282 |

FOREIGN PATENT DOCUMENTS 46-13438  4/1971  Japan .................................. 376/309

Primary Examiner—Daniel D. Wasil
Attorney, Agent, or Firm—J. S. Beulick

[57] ABSTRACT

A method and apparatus decrease the release of volatile radioactive iodine from a nuclear reactor pressure vessel containing a reactor core having fuel rods submerged in water. The method includes monitoring the pressure vessel to determine an accident condition and then injecting into the pressure vessel a stable iodide in liquid solution to mix with the reactor water for decreasing vaporization of volatile radioactive iodine discharged from the fuel rods. A reservoir initially stores the stable iodide in the liquid solution and is operatively joined to the pressure vessel through a supply conduit and a normally closed valve which is selectively opened following the accident condition to inject the stored iodide liquid solution into the pressure vessel to mix with the water therein.

9 Claims, 1 Drawing Sheet

5,337,336

METHOD AND APPARATUS TO DECREASE RADIOACTIVE IODINE RELEASE

The present invention relates generally to nuclear reactors, and, more specifically, to reducing release of volatile radioactive iodine from a reactor core following an accident condition.

BACKGROUND OF THE INVENTION

A nuclear reactor, such as a boiling water reactor (BWR) for example, includes a pressure vessel containing a reactor core including a plurality of fuel rods submerged in water. The pressure vessel is disposed in a drywell enclosure, which in turn is disposed in a containment vessel in an exemplary design.

Each of the fuel rods includes a plurality of nuclear fuel pellets contained in a tubular enclosure or cladding, which fuel undergoes fission during normal operation of the reactor for heating the water in the pressure vessel to generate steam which is conventionally channeled to a steam turbine-generator for producing electrical power for a utility grid for example. The fuel rods have useful lifetimes of several years and are continually shuffled into different positions within the reactor core, and removed and replaced with fresh fuel rods as required for attaining uniform burning, or fissioning, of the fuel rods. One of the by-products of the fission process is iodine, which may take the form of both stable or non-volatile species; or volatile species which vaporize, both of which species may be radioactive or non-radioactive. Typical iodine species include cesium iodide (CsI), hydrogen iodide (HI), and elemental iodine ($I_2$). Iodine may also be found in organic species such as methyl iodide ($CH_3I$), and anomalous species which are presently unknown.

The various iodine species may either be stable or non-volatile such as the cesium iodide compound, or volatile such as the elemental iodine, the hydrogen iodide, the methyl iodide, and the anomalous species. The iodine species may also be either radioactive or non-radioactive, with the total amount thereof in a typical reactor core sized for generating about 1,000 MWe (megawatt electric) being about 10–20 kg after the reactor has been operated for several years.

As long as the fuel rod cladding remains intact, the iodine species will remain therein and not be released. However, in a postulated accident such as a loss-of-coolant accident (LOCA), one or more of the fuel rods may be overheated, which can rupture the fuel rod cladding and allow the iodine therein to be released into the reactor coolant water. Although only a very small fraction of the relatively small total iodine in the reactor core may be expected to be released into the reactor water following the LOCA, the volatile radioactive iodine species will vaporize and be released from the water and escape with the steam into and through the pressure vessel and in turn into the drywell, and further in turn into the containment through any leakage sites contained therein. The radioactive iodine will, therefore, be spread wherever it is allowed to travel, which increases the radioactive contamination area in the reactor plant. It is, therefore, an object of the present invention to decrease or prevent the release of volatile radioactive iodine from the pressure vessel following an accident condition such as the LOCA

SUMMARY OF THE INVENTION

A method and an apparatus in accordance with the invention decrease the release of volatile radioactive iodine from a nuclear reactor pressure vessel containing a reactor core having fuel rods submerged in water. The method includes monitoring the pressure vessel to determine an accident condition and then injecting into the pressure vessel a stable iodide in liquid solution to mix with the reactor water for decreasing vaporization of volatile radioactive iodine discharged from the fuel rods. A reservoir initially stores the stable iodide in the liquid solution and is operatively joined to the pressure vessel through a supply conduit and a normally closed valve which is selectively opened following the accident condition to inject the stored iodide liquid solution into the pressure vessel to mix with the water therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawing in which.

DESCRIPTION OF THE PREFERRED EMBODIMENT(S)

Figure 1:
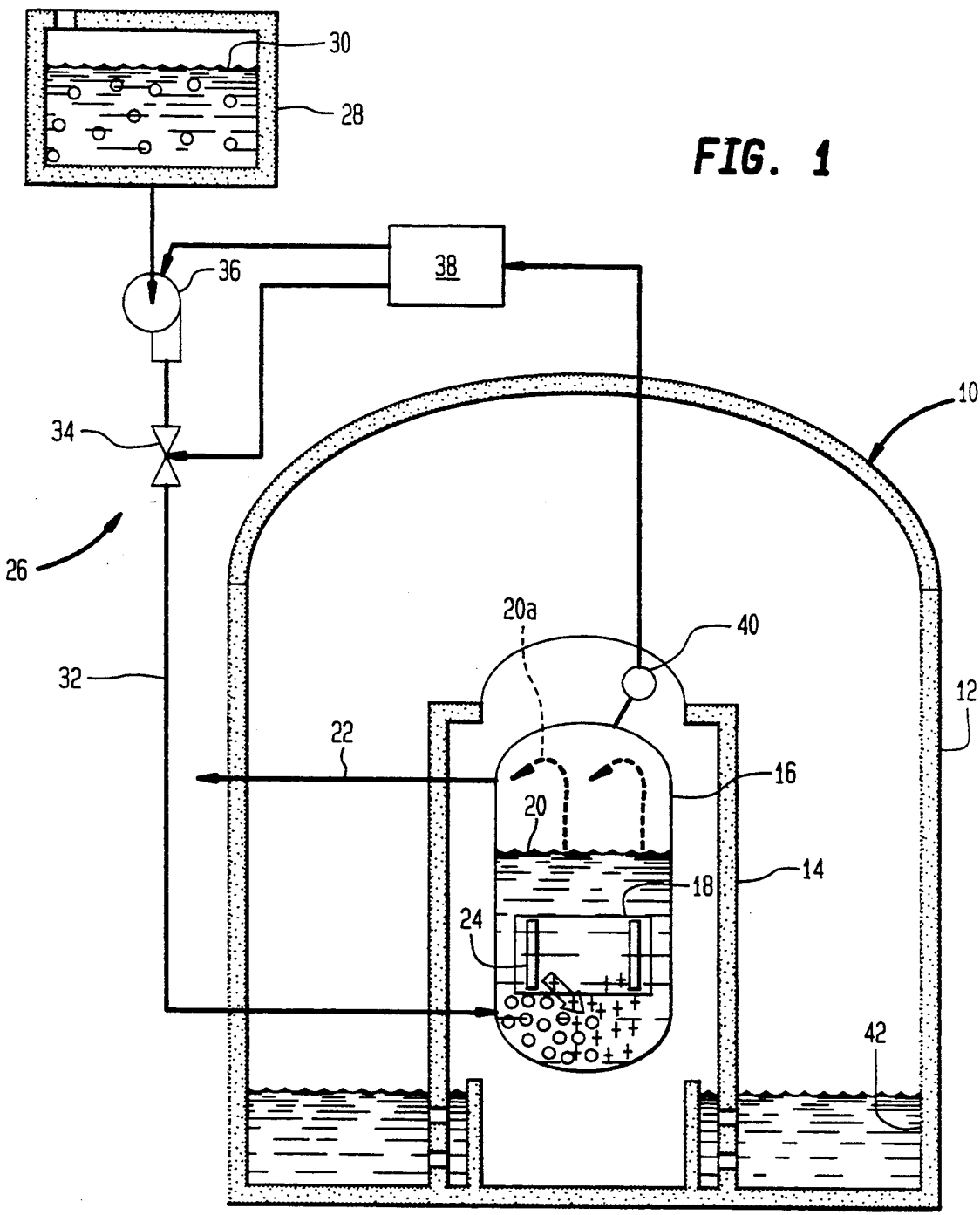
FIG. 1 is a schematic, elevational view of an exemplary nuclear reactor building containing a pressure vessel and an apparatus for injecting stable iodide in liquid solution therein in accordance with an exemplary embodiment of the present invention.

Illustrated schematically in FIG. 1 is a nuclear reactor building 10 including a conventional containment vessel 12 surrounding and fully enclosing a conventional drywell 14 which in turn surrounds and fully encloses a conventional reactor pressure vessel 16. The pressure vessel 16 contains a conventional reactor core 18 normally submerged in reactor coolant or water 20. A conventional main steamline 22 operatively joins the pressure vessel 16 to a conventional steam turbine-generator (not shown) for channeling steam 20a thereto.

More specifically, the reactor core 18 includes a plurality of conventional fuel rods 24 (only two of which are illustrated) typically configured in bundles in a conventional two-dimensional array within the reactor core 18. Each of the fuel rods 24 conventionally includes a plurality of nuclear fuel pellets within an enclosed tubular rod or cladding, and is effective for undergoing nuclear fission, or burning, to heat the reactor water 20 for generating the reactor steam 20a which is conventionally discharged through the main steamline 22 to power the steam turbine.

During normal operation of the reactor core 18, radioactive and non-radioactive iodine will be formed and contained in the fuel rods 24 in various conventional species which may include elemental iodine ($I_2$), cesium iodide (CsI), and hydrogen iodide (HI). Furthermore, organic species such as methyl iodide ($CH_3I$), and anomalous species may also be formed. In an exemplary reactor core 18 sized for generating about 1,000 MWe (megawatt electric), it is estimated that the total inventory of iodine in its various species will be no more than about 20 kg.

During normal operation of the reactor core 18 with the fuel rods 24 remaining intact, the generated iodine species are retained within the fuel rods 24 and are of no additional concern. However, in the event of an accident condition such as a loss-of-coolant accident (LOCA), one or more of the fuel rods 24 may become overheated and rupture and, thereby, release the iodine species into the reactor water 20 within the pressure vessel 16. Since the total iodine inventory is relatively small to begin with, the amount of the iodine species released into the reactor water 20 following the LOCA is yet smaller in quantity. However, the release of volatile radioactive iodine into the reactor water 20 is an important consideration since it may escape with the steam 20a from the pressure vessel 16 to spread radioactive contamination possibly in the drywell 14 and in the containment 12, for example, which, of course, is undesirable.

In accordance with the present invention, an apparatus 26 is provided for controlling or decreasing the release of volatile radioactive iodine from the pressure vessel 16 following an accident condition such as the LOCA. The apparatus 26 includes a conventional reservoir 28 preferably mounted at an elevation above the reactor core 18 and containing a stored stable iodide in a liquid, preferably water, solution 30. The stable iodide contained in the reservoir 28 is non-radioactive and is non-volatile. A conventional supply conduit 32 joins the reservoir 28 in flow communication with the pressure vessel 16, and a normally closed valve 34 is disposed in the supply conduit 32 to prevent flow of the stored solution 30 to the pressure vessel 16 until the valve 34 is selectively opened following the accident condition for allowing the stored solution 30 to flow into the pressure vessel 16 to mix with the reactor water 20 therein.

Following an accident condition such as the LOCA, the pressure vessel 16 is conventionally depressurized by diverting steam therefrom to a conventional suppression pool 42, and, the stored solution 30 may be allowed to flow simply by gravity through the supply conduit 32 and the open valve 34 into the pressure vessel 16. However, a conventional pump 36 may also be used in serial flow communication in the supply conduit 32 for pumping the stored solution 30 through the conduit 32 and into the pressure vessel 16 to ensure the complete and prompt draining of the stored solution 30 from the reservoir 28 and into the pressure vessel 16.

The valve 34 is conventionally operatively joined to a conventional controller 38 which conventionally monitors the pressure vessel 16 to sense for an accident condition such as the LOCA, which, in response thereto, will signal the valve 34 to open as well as energize the pump 36 for injecting into the pressure vessel 16 the stored solution 30. A conventional sensor 40 is operatively joined to the controller 38 and any suitable location such as the pressure vessel 16 for monitoring the pressure vessel 16 to conventionally determine whether or not an accident condition such as the LOCA develops which may lead to the discharging into the reactor water 20 of the volatile radioactive iodine from the fuel rods 24. The sensor 40 is shown schematically to represent one or more sensors which may be used to actually sense the rupture of any of the fuel rods 24 if desired, or may be used to simply monitor the occurrence of the accident condition such as the LOCA in a conventional manner. The monitoring of the accident condition is irrespective of whether or not any of the fuel rods 24 actually ruptures for obtaining a safe shutdown of the reactor core 18 without release of volatile radioactive iodine therefrom.

Accordingly, if monitoring of the pressure vessel 16 indicates the required accident condition such as the LOCA, the controller 38 will cause the valve 34 to open for injecting into the pressure vessel 16 the stable iodide in the liquid solution 30 being stored in the reservoir 28 to mix with the reactor water 20 within the pressure vessel 16 for decreasing or preventing vaporization from the reactor water 20 of any volatile radioactive iodine which may be discharged therein from the fuel rods 24.

By injecting into the pressure vessel 16 an effective amount of the stable, non-volatile iodide, the iodine species generated in the fuel rods 24 during fissioning and actually released into the reactor water 20 following the accident condition will mix and equilibrate with the added iodide and become stabilized, or non-volatile, to reduce or prevent the release of radioactive volatile iodine from the reactor water 20 within the pressure vessel 16 which might escape with the reactor steam 20a.

It is conventionally known that dissolved oxygen, hydrogen peroxide and organic impurities contained in the reactor water 20 within the pressure vessel 16 can promote the formation of volatile iodine following the release of the iodine species into the reactor water 20 from any ruptured fuel rods 24. By introducing added iodine in the form of stable iodide into the reactor water 20 within the pressure vessel 16 following the accident condition, the relative concentration of the dissolved oxygen, hydrogen peroxide and organic impurities with respect to the total iodine decreases, which will, therefore, decrease or prevent the formation of any additional radioactive volatile iodine from the iodine species released from the fuel rods 24.

Furthermore, volatile radioactive iodine which might be released from the fuel rods 24 may be stabilized, or made non-volatile, through conventional isotopic exchange reactions between the iodine species released from the fuel rods 24 and the stable iodide injected into the pressure vessel 16. For example, normal, non-radioactive iodine has an atomic weight of 127, i.e. $I^{127}$, and various isotopes of iodine are radioactive such as $I^{129}$, $I^{131}$, $I^{132}$, $I^{133}$, $I^{134}$, and $I^{135}$. The iodide stored in the solution 30 within the reservoir 28 is a stable, non-volatile compound which may take any suitable and conventional form and is preferably selected from the stable iodide group including sodium iodide (NaI) and potassium iodide (KI). Through the conventional isotopic exchange reactions, the volatile radioactive iodine species will exchange with the iodine in the stable iodide compounds so that the stable iodide compound becomes radioactive and the exchanged or released volatile iodine is non-radioactive. Since the iodide compound is stable, the radioactive iodine now contained therein will not be vaporized but will be retained within the reactor water 20 and will not escape with the steam 20a. The exchanged iodine, although being volatile, will not be radioactive, and its escape with the reactor steam 20a is no longer a concern for the spreading of radiation.

An effective amount of the stored iodide in the solution 30 within the reservoir 28 should have a quantity or mass selected relative to the quantity of the reactor water 20 contained in the pressure vessel 16 to effect a final concentration of total iodine from both the stored iodide and the reactor iodine contained in the reactor core 18 of greater than about $10^{-5}$M (moles), and preferably greater than about $10^{-4}$M. For example, in the exemplary 1,000 MWe reactor core 18 having up to about 20 kg of iodine, including both radioactive, non-radioactive, stable, and volatile, the amount of iodine to be injected into the pressure vessel 16 in the form of the stable iodide solution, is preferably about 200 kg to ensure a final concentration of total iodine of all species, including the original iodine as well as the added iodine in the reactor water 20, preferably greater than or equal to about $10^{-4}$M.

As shown schematically in FIG. 1, the stored solution 30 includes stable iodide as represented graphically by the small circles, which is injected in the liquid solution 30 into the pressure vessel 16 to mix with the reactor water 20 therein to therefore mix with the iodine species released from the fuel rods 24, which are represented graphically by the small plus signs.

Since the stable iodide may be stored in the liquid solution 30 in the reservoir 28 for a considerable number of years, it is preferred to add thereto a suitable stabilizer to inhibit or prevent oxidation of the stored iodide which would decrease its ability to reduce the release of volatile iodine from the pressure vessel 16 following the accident condition. Two exemplary stabilizers which may be used with the preferred sodium iodide being stored in the reservoir 28, which is corrosive, are selected from the group including sodium hydroxide (NaOH) and sodium sulfite ($Na_2SO_3$). An effective amount of the stabilizer is used with the stored iodide to inhibit the oxidation thereof for maintaining its effectiveness to reduce or prevent the release of volatile radioactive iodine in the pressure vessel 16 following the accident condition.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. A method of decreasing release of volatile radioactive iodine from a nuclear reactor pressure vessel containing a reactor core having a plurality of fuel rods submerged in reactor water, said method comprising the steps of:
    storing a stable iodide liquid solution in a reservoir operatively joined to said pressure vessel;
    monitoring said pressure vessel to determine an accident condition which might lead to rupture of said fuel rods resulting in the discharge into said reactor water of said volatile radioactive iodine from said fuel rods; and
    injecting into said pressure vessel upon occurrence of said accident condition said stable iodide liquid solution to mix with said reactor water for decreasing vaporization from said reactor water of said volatile radioactive iodine dischargeable therein from said fuel rods,
    wherein said stored iodide has a quantity selected relative to the quantity of said reactor water is said pressure vessel to effect a final concentration of total iodine from said stored iodide and reactor iodine contained in said reactor core of greater than about $10^{-5}$ Moles.

2. A method according to claim 1 wherein said iodide stored in said liquid solution in said reservoir is selected from the stable iodide group including sodium iodide (NaI) and potassium iodide (KI).

3. A method according to claim 2 wherein said stored liquid iodide solution further includes a stabilizer to inhibit oxidation of said stored iodide during storage in said reservoir.

4. A method according to claim 3, wherein said stored iodide is sodium iodide and said stabilizer is selected from the group including sodium hydroxide and sodium sulfite.

5. A method of decreasing release of volatile radioactive iodine from a nuclear reactor pressure vessel containing a reactor core having a plurality of fuel rods submerged in reactor water, said method comprising the steps of:
    storing a stable iodide liquid solution in a reservoir operatively joined to said pressure vessel, said stable iodide liquid solution comprising an iodide selected from the stable iodide group including sodium iodide (NaI) and potassium iodide (KI) and a stabilizer to inhibit oxidation of said stored iodide during storage;
    monitoring said pressure vessel to detect an accident condition which might lead to rupture of said fuel rods resulting in the discharge into said reactor water of said volatile radioactive iodine from said fuel rods; and
    injecting into said pressure vessel upon detection of said accident condition said stable iodide liquid solution to mix with said reactor water for decreasing vaporization from said reactor water of said volatile radioactive iodine dischargeable therein from said fuel rods,
    wherein said stored iodide has a quantity selected relative to the quantity of said reactor water in said pressure vessel to effect a final concentration of total iodine from said stored iodide and reactor iodine contained in said reactor core of greater than about $10^{-5}$ Moles.

6. A nuclear reactor plant comprising:
    a pressure vessel;
    a reservoir containing a stored stable iodide in a liquid solution;
    a supply conduit joining said reservoir in flow communication with said pressure vessel; and
    a normally closed valve disposed in said supply conduit and being selectively openable for allowing said stored solution to flow into said pressure vessel to mix with said reactor water,
    wherein said stored iodide has a quantity selected relative to the quantity of said reactor water in said pressure vessel to effect a final concentration of total iodine from said iodide and reactor iodine contained in said reactor core of greater than about $10^{-5}$ Moles.

7. An apparatus according to claim 6 wherein said stored iodide is selected from the stable iodide group including sodium iodide (NaI) and potassium iodide (KI).

8. An apparatus according to claim 7 wherein said stored solution in said reservoir includes a stabilizer to inhibit oxidation of said stored iodide during storage in said reservoir.

9. An apparatus according to claim 8 wherein said stored iodide is sodium iodide (NaI) and said stabilizer is selected from the group including sodium hydroxide (NaOH) and sodium sulfite ($Na_2SO_3$).

* * * * *